United States Patent [19]

Jones

[11] Patent Number: 5,710,408
[45] Date of Patent: Jan. 20, 1998

[54] AUTOMATIC CONTROLLED FOR AN ICE AND SNOW MELTING SYSTEM WITH GROUND FAULT CIRCUIT INTERRUPTION

[75] Inventor: Thaddeus M. Jones, Bremen, Ind.

[73] Assignee: MSX, Inc., South Bend, Ind.

[21] Appl. No.: 696,562

[22] Filed: Aug. 15, 1996

[51] Int. Cl.$^6$ ...................................................... H05B 1/02
[52] U.S. Cl. .................... 219/481; 219/497; 219/506; 219/549; 219/213; 340/580; 361/42
[58] Field of Search ...................... 219/213, 544, 219/528, 549, 481, 506, 497, 499, 505; 340/581, 580; 361/42, 44–50, 87, 90

[56] References Cited

U.S. PATENT DOCUMENTS

| | | | |
|---|---|---|---|
| 4,023,043 | 5/1977 | Stevenson | 307/38 |
| 4,520,417 | 5/1985 | Frank | 361/45 |
| 4,859,834 | 8/1989 | Hausler et al. | 219/497 |
| 4,967,059 | 10/1990 | Bayless et al. | 219/213 |
| 5,140,135 | 8/1992 | Freeman | 219/497 |
| 5,344,696 | 9/1994 | Hastings et al. | 219/529 |
| 5,591,365 | 1/1997 | Shields | 219/213 |

*Primary Examiner*—Mark H. Paschall
*Attorney, Agent, or Firm*—Taylor & Associates, P.C.

[57] ABSTRACT

The invention is directed to an ice and snow melting system. At least one sensor is provided, with each sensor being configured for sensing a temperature or moisture associated with an ambient environment and providing a signal indicative thereof. A heater for melting the ice and snow includes at least two electrical conductors associated therewith. An automatic controller is connected to the at least one sensor, and includes a ground fault circuit interrupter in communication with at least two of the electrical conductors associated with the heater. The ground fault circuit interrupter detects a ground fault condition associated with the heater and provides a signal indicative thereof. The controller selectively controls operation of the heater dependent upon the sensor signal and/or the ground fault circuit interrupter signal.

10 Claims, 2 Drawing Sheets

AUTOMATIC CONTROLLED FOR AN ICE AND SNOW MELTING SYSTEM WITH GROUND FAULT CIRCUIT INTERRUPTION

BACKGROUND OF THE INVENTION

1. Field of the Invention

The present invention relates to electric heaters, and, more particularly, to automatic controls for electric heaters used to melt and thus remove snow and ice from pavement, roofs, gutters, down spouts and the like.

2. Description of the Related Art

Electric heaters may be utilized to supply heat used in snow and ice melting systems. Typical melting applications include but are not limited to roofs and gutters, pavement, building and garage entrances and facilities accommodating the physically challenged. Efficient operation requires embedding the electric heaters in pavement and other structures which may sometimes become covered with snow and ice.

Heater cable construction may employ one of several methods. For example, self-limiting heaters typically consist of two parallel stranded copper bus wires separated by a semiconducting polymer enclosed in one or more concentric layers of organic insulating material. Other common heater cable construction methods involve extruding a thermoplastic insulating compound over a single conductor or a pair of parallel conductors. Another construction method, the oldest, involves packing mineral insulation, commonly magnesium oxide, over a single conductor or a pair of parallel conductors enclosed within a copper or stainless steel tube. Current practice as dictated by the U.S. National Electric Code requires covering the heating cable with a grounded conductive copper braid that serves as a return path for any ground current. Mineral insulated heaters accomplish this requirement by way of their outer stainless steel or copper tubular jackets.

Ground current is the difference between the outbound and return heater currents. The U.S. National Electric Code requires using a ground fault circuit interrupter (GFCI) on all snow and ice melting circuits. The GFCI interrupts heater current if the ground current exceeds a predetermined limit; usually 30 milliamperes. The GFCI requires manual reset after tripping. This preserves safety by not restarting heater operation during intermittent ground leakage current that may occur in wet locations.

Independent of the heater fabrication method, ground current can flow due to a heater failure caused by a manufacturing defect, corrosion, wear and tear or mechanical damage. Excessive ground current causes the dual safety problems of fire and shock hazard.

The fire hazard is variously referred to as a wet fire or heater burn-back. Although this can occur with heaters of any construction, it is more likely to occur in heaters with parallel conductors in the presence of moisture. Conductors exposed to the ambient due to mechanical damage are the starting point for the fire hazard. Moisture acting as an electrolyte on the cable in the area of the damage forms a conductive path between parallel conductors or between a conductor and ground. Current flows through a small area and strikes an arc which creates a high temperature plasma. This carbonizes a portion of the polymer insulation and creates an arc track in the carbon which is an electrical conductor. Flames and high temperatures occurring during the burn-back can ignite combustible materials in proximity to the heating cable. The burn-back mechanism in mineral insulated cable is similar except that magnesium hydroxide forms by mixing moisture with the magnesium oxide insulation to form a conductive electrolyte.

Aside from the fire hazard described above, an electrical shock hazard can also occur whenever ground current flows since its path to earth ground is usually not predictable. Thus, a GFCI is required to be incorporated into snow and ice melting electrical circuits.

Snow and ice melting systems commonly employ automatic controls that operate heaters only while required to minimize energy consumption and operating costs. Typically, the automatic controls sense ambient moisture and temperature. Heaters operate at ambient temperatures below a threshold—usually 38° F. while ambient moisture is present and for a period of time thereafter to clear accumulated snow and ice. Optionally, the automatic control may inhibit heater operation at temperatures too low for effective melting, e.g., below 17° F.

Current practice is to use a GFCI circuit breaker external to the automatic control of the snow and ice melting system. Such a self-contained GFCI circuit does not provide an output signal indicative of a ground fault condition. The automatic control may or may not require an external contactor for controlling heater operation.

SUMMARY OF THE INVENTION

The present invention relates to a method for automatically controlling snow and ice melting electric heaters while continuously monitoring the ground leakage current. Upon detecting a ground leakage current above a predetermined level, the automatic controller interrupts electrical power provided to the heater until reset by operating personnel. Thus, the present invention combines the GFCI function with the automatic controller associated with the snow melting heaters. The automatic controller performs these tasks within norms established by the U.S. National Electrical Code and the testing requirements established by Underwriters' Laboratories.

The invention comprises, in one form thereof, an ice and snow melting system. At least one sensor is provided, with each sensor being configured for sensing a temperature or moisture associated with an ambient environment and providing a signal indicative thereof. A heater for melting the ice and snow includes at least two electrical conductors associated therewith. An automatic controller is connected to the at least one sensor, and includes a ground fault circuit interrupter in communication with at least two of the electrical conductors associated with the heater. The ground fault circuit interrupter detects a ground fault condition associated with the heater and provides a signal indicative thereof. The controller selectively controls operation of the heater dependent upon the sensor signal and/or the ground fault circuit interrupter signal.

An advantage of the present invention is that the automatic control and GFCI functions are combined together into a single automatic controller, thereby reducing installation cost and complexity.

Another advantage of the present invention is that by combining the automatic control and GFCI functions, an automatic controller costing less than individual GFCI and automatic snow and ice melting controls is realized.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
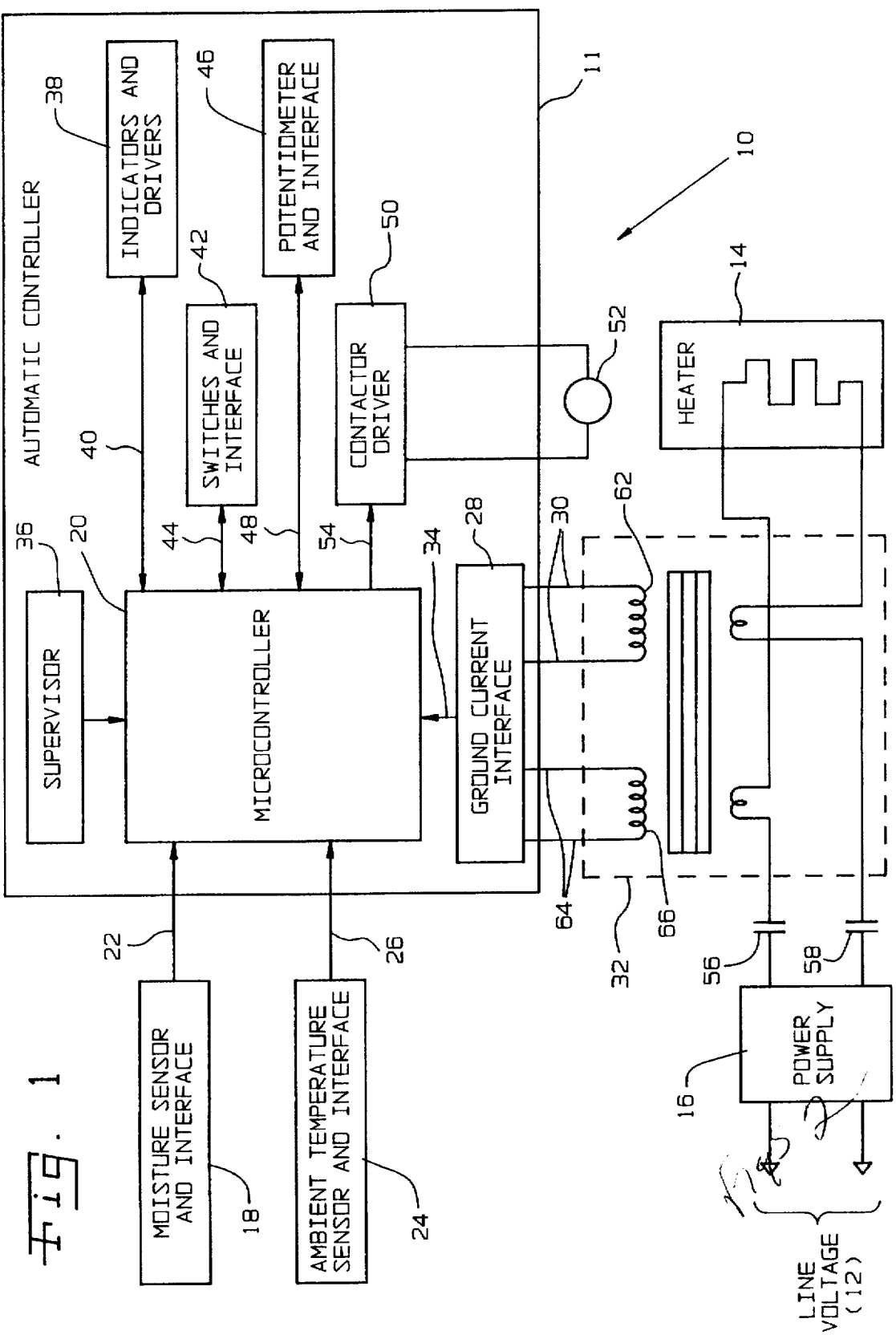
FIG. 1 is a schematic illustration of an embodiment of the overall snow and ice system of the present invention, showing each of the subsystems and their interconnections.

Referring now to the drawings and particularly to FIG. 1, there is shown an overall view of an embodiment of a snow and ice melting system 10 of the present invention. Snow and ice system 10 generally includes an automatic controller 11, heater 14, power supply 16, moisture sensor and interface 18, ambient temperature sensor and interface 24 and toroidal transformer 32.

Unless otherwise noted, details familiar to persons skilled in the electronic arts will be omitted since they are extraneous detail and thus have no bearing on reducing the invention to practice. Where in this application the terms "control", "controlling" or the like are used, it is to be understood that such terms may include the meaning of the terms "regulate", "regulating", etc. That is, such "control" may or may not include a feedback loop. Moreover, it is also to be understood, and it will be appreciated by those skilled in the art, that the methodology and logic of the present invention described herein may be carried out using any number of structural configurations such as electronic hardware, software, and/or firmware, or the like.

A line voltage 12 supplies power to system 10 including heaters 14. Power supply 16 derives its power from the line voltage 12 and supplies all circuits with appropriate AC and DC operating voltages.

Automatic controller 11, in the embodiment shown, is constructed as an integral unit which includes a number of separate subsystems or modules. In the particular embodiment shown in FIG. 1, controller 11 includes an electrical processor or microcontroller 20, a ground current interface 28, supervisor 36, indicators and drivers 38, switches and interface 42, potentiometer and interface 46, and contactor driver 50. Such modules or subsystems are preferably incorporated into a single housing, shown schematically in FIG. 1. However, it will also be appreciated that any of the individual subsystems or modules making up automatic controller 11 may also be separate or remotely located from automatic controller 11, if desirable for a particular application.

The moisture sensor and interface 18 uses an on-board temperature regulated heater to convert snow and/or ice to liquid water. Water on the surface of a sensing grid is detected as a change in conductivity. An interface circuit incorporated within moisture sensor and interface 18 converts the conductivity change into a low-impedance analog signal which is transmitted to an electrical processor such as a microcontroller 20 via conductor 22.

The ambient temperature sensor and interface 24 converts the ambient temperature sensor signal into an analog signal which is appropriate for inputting to the microcontroller 20 via a conductor 26.

In the embodiment of ice and snow melting system 10 shown in the drawings, moisture sensor and interface 18 and ambient temperature sensor and interface 24 are shown as separate subsystems. However, it is also possible to combine moisture sensor and interface 18 and ambient temperature sensor and interface 24 into a single subsystem. An example of a single sensor which may combine the moisture sensing and ambient temperature sensing into a single unit is known, e.g., from a model CIT-1 Snow Sensor and a model GIT-1 Gutter Ice Sensor, each of which are manufactured by the Assignee of the present invention.

The ground current interface 28 converts the signal supplied by conductors 30 from current transformer 32 into a linearly proportional signal appropriate for inputting to the microcontroller 20 via conductor 34.

The supervisor 36 controls the restarting of microcontroller 20 upon the initial application of power and under brown-out conditions. Supervisor 36 holds the microcontroller 20 in its reset condition so long as its supply voltage is too low to permit reliable operation. Supervisor 36 asserts reset until the supply voltage has been reliable long enough for the microcontroller 20 to initialize itself.

The microcontroller 20 in combination with its firmware form the primary subsystem of snow and ice melting system 10. Microcontroller 20 provides one time programmable program memory, data memory, program alterable permanent memory (i.e., electrically erasable read only memory (EEROM), an 8-bit analog to digital (A/D) converter, timers, counter, a fail-safe (i.e., watch dog) timer and digital inputs and outputs. If the fail-safe timer is not reset frequently enough, it restarts the microcontroller 20. This prevents microcontroller 20 from latching due to electrical transients from lighting and similar causes. An example of a microcontroller which has been found suitable for use within automatic controller 11 is a PIC16C84 manufactured by Microchip Corporation, Chandler, Ariz.

The indicators and drivers 38 provide status information for operating personnel. Typical status information includes but is not limited to the presence of electric power, snow, operation of heater 14 and a ground fault condition. In the particular embodiment shown, the indicators are visible light emitting diodes (LED's), and the associated drivers consist of bipolar or metal oxide field effect transistors used as saturating power amplifiers for the low power microcontroller 20 outputs received over conductor(s) 40. However, some microcontrollers have sufficient current capacity to drive the LED's directly.

The switches and interface 42 provides an interface between operating personnel and the automatic snow and ice melting control. Switches and interface 42 is connected to microcontroller 20 via conductors 44. Switch functions include but are not limited to test/reset of the GFCI, testing of heater 14, cycle heater 14 and abort heater operation. Typically, the interface consists of a pull-up resistor for each active switch contact.

The potentiometer and interface 46 converts a potentiomer shaft azimuth into a proportional analog signal for input via conductor(s) 48 to an analog to digital (A/D) converter associated with microcontroller 20. Since the particular microcontroller 20 described with reference to FIG. 1 includes an A/D converter, interface circuitry is not required. Counter-clockwise potentiometer terminals are grounded and clockwise terminals are connected to the A/D converter reference voltage—typically the positive supply voltage for microcontroller 20. The potentiometer's wiper is connected directly to an A/D converter input. If the microcontroller used does not provide the analog to digital converter function, the potentiometer shaft position can be directly inputted to a digital input through the use of a resistor-capacitor network and a digital output using techniques well known to persons skilled in the electronic arts.

Depending upon the application, it may take several hours for the system to heat to ice melting temperature, thus causing an accumulation of snow and ice. Removing the accumulation requires heater operation for a period of time after precipitation stops. Automatic controls usually provide an adjustable hold-on timer for this purpose. An analog potentiometer associated with potentiometer and interface 46 provides a calibrated hold-on time adjustment.

The contactor driver 50 is a saturated power amplifier employing either a bipolar or metal oxide field effect transistor to drive the solenoid coil of a contactor 52. Microcontroller 20 output port(s) 54, in the particular embodiment shown, lack the voltage and current capacity to do this directly. Contactor 52 provides two normally open contacts that control power applied to the heater 14. More particularly, contactor 52 is connected to one side of respective relays including relay contacts 56, 58. The U.S. National Electrical Code requires breaking both line leads of 208/240/480 volt circuits. Only the line side and not the neutral side of the power line needs to be broken in 120/277 volt circuits.

The current transformer or toroidal transformer 32 senses the ground leakage current. The heater 14 supply leads are passed through the opening in transformer 32. These constitute two single turn primary windings. If there is no ground leakage current flows, identically equal and opposite currents flow through these single turn windings. Any ground leakage current unbalances these currents thus causing a voltage to be induced in a secondary winding 62 connected to the ground current interface 28 through conductors 30.

The ground current interface 28 supplies a test current at the power line frequency. This current flows through conductors 64 and through an auxiliary secondary winding 66. Operating personnel operate a test switch to apply current to auxiliary secondary winding 66. The current applied to winding 66 is of sufficient strength to operate and thus test the GFCI function.

Figure 2:
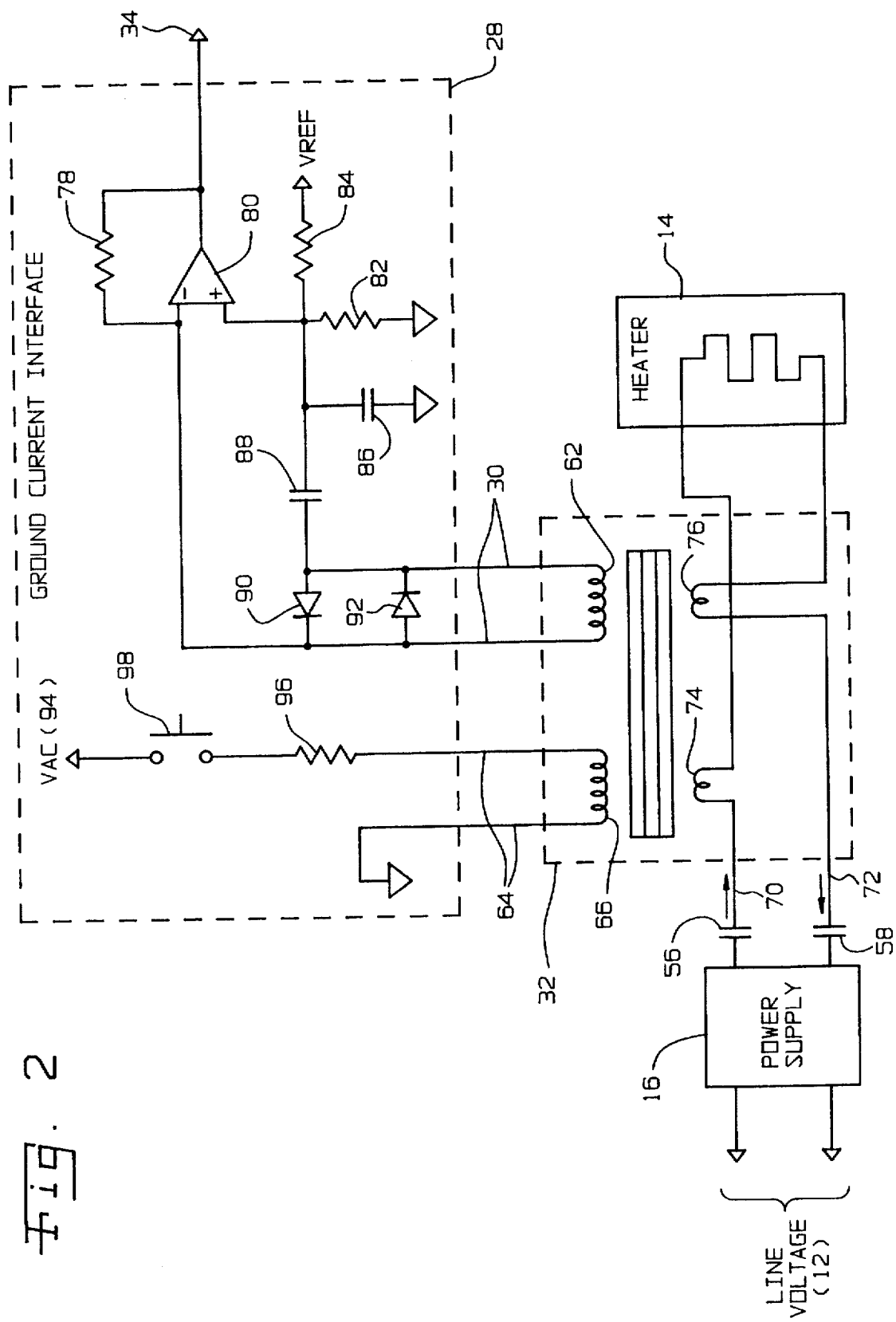
FIG. 2 is a simplified schematic illustration of the details of an embodiment of the ground current sensing subsystem of the present invention, with details relating to the actual hardware selected to implement the subsystem functions being omitted.

Referring now to FIG. 2, toroidal transformer 32 subtracts the two line currents present on conductors 70 and 72. Secondary winding 62 produces a current flow equal to the difference between the power line currents flowing through the one-turn primary windings 74 and 76 divided by the number of turns of wire in secondary winding 62. This current is multiplied by the ohmic value of the feedback resistor 78 thus equaling the AC component of the voltage on conductor 34 appearing at the output of the operational amplifier 80. Thus, this circuit converts the ground current into a linearly proportional AC voltage on conductor 34. This circuit forces the voltage appearing at the output of the secondary winding 62 to be near zero. This corresponds to zero flux in the core of the current transformer 32. Zero flux means zero losses which improves accuracy. Over a wide range the calibration of the ground current to voltage converter circuit depend only upon the number of turns of wire in the secondary winding 62 assuming single turn primary windings 74 and 76 and not upon the core material used to fabricate current transformer 32.

The invention employs a single positive DC supply voltage for all low level analog circuits and microcontroller 20. Thus, the AC ground current signal varies about a DC voltage that is equal to one half of the supply voltage. The voltage divider network including resistors 82 and 84 develops the DC bias equal to one half of the power supply voltage appearing at the output of operational amplifier 80. A capacitor 86 ensures that the voltage divider output impedance is low at the power line frequency.

Without a blocking capacitor 88, the DC voltage gain of the ground current to voltage converter circuit employing the operational amplifier 80 would be determined by the ratio of the winding resistance of secondary winding 62 and feedback resistor 78 - a value approaching the open loop gain of the operational amplifier 80. The operational amplifier's offset voltage amplified by this high gain would cause nonlinear distortion due to saturation. The DC blocking capacitor reduces the circuit gain to unity at DC thus eliminating nonlinear distortion.

The silicon diodes 90 and 92 clamp the voltage at the output of the secondary winding 62 to their forward voltage drop. This protects operational amplifier 80 from destructive voltage transients that could occur under extreme ground fault conditions, e.g., if a direct short circuit occurred between a supply line and ground.

Ground current interface 28 requires occasional testing to ensure that functions are within appropriate limits. This is accomplished by passing a known current through auxiliary secondary winding 66. The magnitude of the AC voltage VAC 94 and the value of a resistor 96 set the test current. Operating the switch 98 causes the test current to flow thus activating the GFCI function. Using multiple turns for the auxiliary secondary winding 66 reduces the test current required. This reduces the power required from VAC 94 while reducing the power dissipated in the resistor 96.

As apparent from the foregoing description, the present invention combines the functions of automatic snow and ice melting control with ground fault circuit interruption. Automatic controller 11 causes melting by operating control contactor 52 to close relay contacts 56 and 58 thus applying the line voltage 12 to heaters 14. Operation continues while moisture is present and the ambient temperature is in the operating range and for the hold-on time thereafter. Ground current monitoring starts a couple of seconds after the automatic control actuates the contactor solenoid 14. The delay prevents false GFCI operation resulting from unbalanced transient current flow that may occur upon application of power to the heaters.

Operationally, the GFCI function has a higher priority than automatic control. That is, unless a ground fault current occurs, controller 11 performs an automatic snow and ice melting control function. Upon detecting a ground current above a threshold value, the invention terminates its automatic control function and acts as a GFCI. Once tripped, operating personnel must operate a reset switch to cancel GFCI operation even though power may have been removed from the automatic controller. An indicator displays GFCI operation.

In addition to the normal control functions of automatic controller 11, operation of an override switch forming a part of switches and interface 42 causes heaters 14 to operate for the hold-on time independent of environmental conditions. This permits clearing tracked snow in doorways and parking garage entrances that go undetected by the sensor. Another switch permits testing heaters for a brief interval. This permits nondestructive heater testing during the summer months.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claim:

1. An ice and snow melting system, comprising: at least one sensor, each said sensor being configured for sensing one of temperature and moisture associated with an ambient environment and providing a signal indicative thereof;

a heater for melting the ice and snow, said heater including at least two electrical conductors associated therewith; and an automatic controller connected to said at least one sensor, said controller including heater control circuitry and a ground fault circuit interrupter, said ground fault circuit interrupter being in communication with at least two of said electrical conductors associated with said heater, said ground fault circuit interrupter detecting a ground fault condition associated with said heater and providing a signal indicative thereof, said heater control circuitry of said controller receiving each of said sensor signal and said ground fault circuit interrupter signal and selectively controlling operation of said heater dependent upon said sensor signal and said ground fault circuit interrupter signal.

2. The ice and snow melting system of claim 1, wherein said controller includes said ground fault circuit interrupter integrally therewith.

3. The ice and snow melting system of claim 1, wherein said at least one sensor comprises a plurality of sensors, at least one of said sensors sensing a temperature associated with the ambient environment and at least another of said sensors sensing moisture associated with the ambient environment.

4. The ice and snow melting system of claim 1, further comprising a circuit transformer electrically interconnecting said ground fault circuit interrupter with said heater, said circuit transformer providing a signal to said ground fault circuit interrupter corresponding to a current in at least two of said electrical conductors associated with said heater.

5. The ice and snow melting system of claim 1, wherein said automatic controller further comprises a contactor driver connected with at least one of said electrical conductors of said heater.

6. The ice and snow melting system of claim 1, wherein said heater control circuitry comprises a microcontroller and a contactor driver.

7. An automatic controller for use in a system for melting ice and snow, the system including at least one sensor for sensing an ambient condition and providing a corresponding output signal, the system further including a heater having at least two electrical conductors, said controller comprising:

a ground fault circuit interrupter configured for communication with at least two of the electrical conductors of the heater, said ground fault circuit interrupter detecting a ground fault condition associated with the heater and providing a corresponding signal; and an electrical processor connected with said ground fault circuit interrupter and receiving said ground fault circuit interrupter signal, said electrical processor being configured for connection with the at least one sensor to receive the sensor signal, said processor being configured to selectively control operation of the heater dependent upon said ground fault circuit interrupter signal and the sensor signal.

8. The automatic controller of claim 7, wherein said electrical processor comprises a microcontroller.

9. A method of controlling a heater used to melt ice and snow, comprising the steps of:

providing heater control circuitry for selectively controlling operation of the heater;

sensing one of temperature and moisture associated with an ambient environment and providing a signal indicative thereof;

transmitting said sensed signal to said heater control circuitry;

detecting a ground fault condition associated with the heater with a ground fault circuit interrupter and providing a signal indicative thereof;

transmitting said ground fault circuit interrupter signal to said heater control circuitry; and selectively controlling the operation of the heater with said heater control circuitry, dependent upon said sensor signal and said ground fault circuit interrupter signal.

10. The method of claim 9, wherein said controlling step comprises controlling the operation of the heater with said electrical processor, dependent upon each of said sensor signal and said ground fault circuit interrupter signal.

* * * * *

UNITED STATES PATENT AND TRADEMARK OFFICE
CERTIFICATE OF CORRECTION

PATENT NO. : 5,710,408
DATED : January 20, 1998
INVENTOR(S) : Thaddeus M. Jones

It is certified that error appears in the above-indentified patent and that said Letters Patent is hereby corrected as shown below:

<u>TITLE PAGE</u>, ITEM [54],

In the title, delete "AUTOMATIC CONTROLLED FOR AN ICE AND SNOW MELTING SYSTEM WITH GROUND FAULT CIRCUIT INTERRUPTION" and substitute --AUTOMATIC CONTROLLER FOR AN ICE AND SNOW MELTING SYSTEM WITH GROUND FAULT CIRCUIT INTERRUPTION-- therefor.

<u>COLUMN 1</u>

Lines 1-3. delete "AUTOMATIC CONTROLLED FOR AN ICE AND SNOW MELTING SYSTEM WITH GROUND FAULT CIRCUIT INTERRUPTION" and substitute --AUTOMATIC CONTROLLER FOR AN ICE AND SNOW MELTING SYSTEM WITH GROUND FAULT CIRCUIT INTERRUPTION-- therefor.

<u>COLUMN 5</u>

Line 28, add after 56. 58. --Thus, microcontroller 20 and contactor driver 50 define heater control circuitry within automatic controller 11 for selectively controlled operation of heater 14, through contactor 52 and relay contacts 56, 58.-- therefor.

Signed and Sealed this

Thirty-first Day of March, 1998

Attest:

BRUCE LEHMAN

*Attesting Officer*   *Commissioner of Patents and Trademarks*